US010060828B2

(12) United States Patent
Roe et al.

(10) Patent No.: US 10,060,828 B2
(45) Date of Patent: Aug. 28, 2018

(54) CONTROL SYSTEM HAVING PISTON RIM DAMAGE COUNTING

(71) Applicant: Caterpillar Inc., Peoria, IL (US)

(72) Inventors: Austin Paul Roe, Morton, IL (US); Anthony T. Petrou, Peoria, IL (US); Matthew Rowan, Chillicothe, IL (US); Timothy Edward McGreevy, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 344 days.

(21) Appl. No.: 15/087,439

(22) Filed: Mar. 31, 2016

(65) Prior Publication Data

US 2017/0284897 A1 Oct. 5, 2017

(51) Int. Cl.
G01M 15/05 (2006.01)
G01M 15/08 (2006.01)
F02D 35/02 (2006.01)
G05B 17/00 (2006.01)
F02B 77/08 (2006.01)

(52) U.S. Cl.
CPC ........... G01M 15/05 (2013.01); F02B 77/085 (2013.01); F02D 35/023 (2013.01); F02D 35/025 (2013.01); G01M 15/08 (2013.01); G05B 17/00 (2013.01)

(58) Field of Classification Search
CPC ..... G01M 15/05; G01M 15/08; F02B 77/085; F02D 35/023; F02D 35/025; G05B 17/00
See application file for complete search history.

(56) References Cited

U.S. PATENT DOCUMENTS 7,409,928 B2      8/2008   Rizoulis et al.
8,116,990 B2 *    2/2012   Koul ................ G05B 23/0283
                                                324/548
8,701,625 B2 *    4/2014   Petersen ................ F02B 77/08
                                                123/198 D (Continued)

FOREIGN PATENT DOCUMENTS

CN          101593228 A       12/2009

OTHER PUBLICATIONS

SAE International, "Piston Bowl Rim Cracks—A More Detailed Analysis", pdfcowd.com, pp. 1-2.

(Continued)

Primary Examiner — Russell Warren Frejd
(74) Attorney, Agent, or Firm — Finnegan, Henderson, Farabow, Garrett & Dunner, LLP

(57) ABSTRACT

An imbedded control system is disclosed for use with an engine having a combustion chamber and an associated piston. The control system may have at least one sensor configured to generate a signal indicative of a combustion process occurring inside the combustion chamber, and a controller in communication with the at least one sensor. The controller may be configured to determine an amount of heat and a pressure generated inside the combustion chamber based on the signal and a combustion model, to determine a heat flux through the piston based on the amount of heat and a heat flux model, and to determine a temperature at a rim of the piston based on the heat flux and a thermal model. The controller may be further configured to track a time at the temperature and the pressure, and to determine a damage count of the piston based on the time.

20 Claims, 4 Drawing Sheets

(56) References Cited

U.S. PATENT DOCUMENTS

2011/0137575 A1     6/2011   Koul
2015/0059690 A1*   3/2015   Svensson ................ F02D 41/38
                                                             123/344
2015/0345421 A1* 12/2015   Gniesmer ........... F02B 23/0603
                                                              123/193.6

OTHER PUBLICATIONS https://en.wikipedia.org/wiki/Thermo-mechanical_fatigue, pp. 1-2.

* cited by examiner

CONTROL SYSTEM HAVING PISTON RIM DAMAGE COUNTING

TECHNICAL FIELD

The present disclosure relates generally to a control system and, more particularly, to a control system having piston rim damage counting.

BACKGROUND

An internal combustion engine includes an engine block defining a plurality of cylinder bores, a crankshaft rotatably supported in the engine block, and pistons connected to the crankshaft and configured to reciprocate within the cylinder bores. Typically, each piston includes a skirt pivotally connected to the crankshaft, and a crown connected to a distal end of the skirt. A combustion bowl is formed in an end face of the crown to receive injected fuel, and annular grooves are formed in an outer surface of the crown to receive associated rings. A cooling passage is annularly formed inside the crown, between the bowl and the cooling passage, to circulate oil that functions to cool the bowl.

During operation of the engine, fuel and air is combusted inside the cylinder bore (and inside the piston bowl), to generate heat and pressure that is turned into mechanical work. The heat and pressure, however, also act on a rim of the piston that divides the bowl from the end face. Over time, as engines are required to produce greater amounts of power more efficiently and/or with lower amounts of regulated pollutants, an amount and/or an effect of the heat and pressure acting on the piston rim has increased. In some applications, this heat and pressure is significant enough to prematurely degrade or even cause failure of some piston rim designs.

In order for engine components, such as pistons, to be designed that can withstand extreme temperatures over an extended period of time, it can be important to understand the environment in which the components are intended to operate. Historically, this has been done by way of instrumented engines within a lab setting. Specifically, pressures and temperatures measured in the lab setting were used as input to finite element analysis, to determine corresponding strains exerted on the rim of a piston bowl. The piston bowl design was then adjusted, until an acceptable amount of strain was realized.

Although the historical approach may be useful in some situations, it may lack applicability and benefit. In particular, the historical approach may not provide help in analyzing real-world conditions under which the piston operates. In addition, this approach may not take into account a time spent at a range of temperatures and pressures, or how that time affects a damage count of the piston. Further, the benefit of the historical approach may be associated only with piston design, and not with monitoring actual piston damage.

The control system of the present disclosure solves one or more of the problems set forth above and/or other problems in the art.

SUMMARY

In one aspect, the present disclosure is directed to a control system imbedded within an engine having at least one combustion chamber and a piston associated with the at least one combustion chamber. The control system may include at least one sensor configured to generate a signal indicative of a combustion process occurring inside the at least one combustion chamber, and a controller in communication with the at least one sensor. The controller may be configured to determine an amount of heat and a pressure generated inside the at least one combustion chamber based on the signal and a combustion model of the engine, to determine a heat flux through the piston based on the amount of heat and a heat flux model of the piston, and to determine a temperature at a rim of the piston based on the heat flux and a thermal model of the piston. The controller may be further configured to track a time at the temperature and the pressure, and to determine a damage count of the piston based on the time at the temperature and pressure.

In another aspect, the present disclosure is directed to a method of monitoring an engine by an imbedded control system. The method may include sensing at least one parameter of a combustion process occurring inside at least one combustion chamber of the engine, and determining an amount of heat and a pressure generated inside the combustion chamber based on the at least one parameter, a known compression ratio of the engine, a known bore diameter of the at least one combustion chamber, a known stroke length of an associated piston, an assumed mixing of fuel and air occurring inside the at least one combustion chamber, and a combustion model of the engine. The method may also include determining a heat flux through the piston based on the amount of heat, known material and geometry data of the piston, and a heat flux model of the engine, determining a temperature of coolant circulating through the piston, and determining a temperature at a rim of the piston based on the heat flux, a thermal model of the piston, and the temperature of the coolant. The method may further include tracking a time at the temperature and the pressure, and determining in real-time a damage count of the piston based on the time at the temperature and pressure and based on a damage model of the piston.

DETAILED DESCRIPTION

Figure 1:
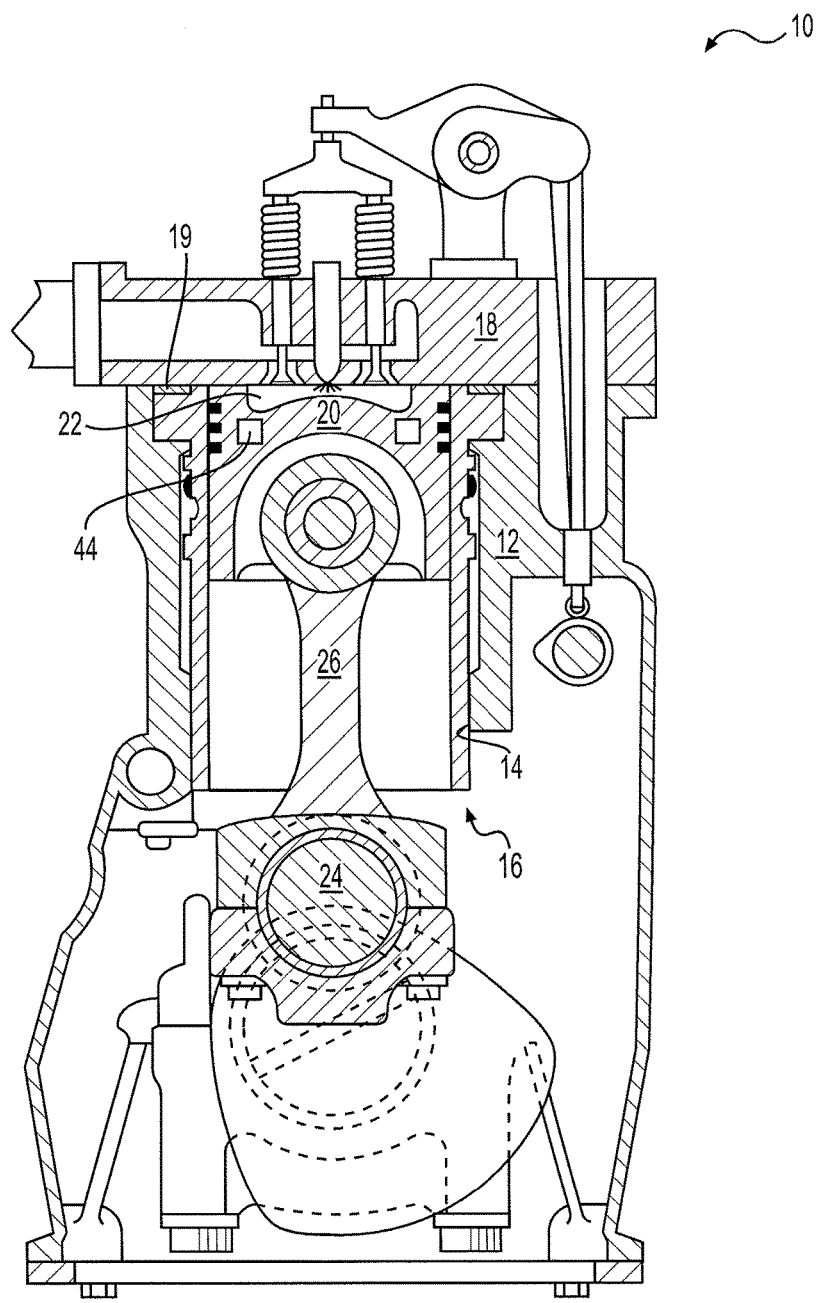
FIG. 1 is a cross-sectional and diagrammatic illustration of an exemplary disclosed engine.

FIG. 1 illustrates a portion of an exemplary internal combustion engine 10. Engine 10 may include a block 12 defining one or more bores 14. A hollow liner 16 may be disposed within each bore 14, and a head 18 may be connected (e.g., by way of a gasket 19) to block 12 to close off an end of bore 14 and liner 16. A piston 20 may be slidably disposed within liner 16, and piston 20 together with liner 16 and head 18 may define a combustion chamber 22. It is contemplated that engine 10 may include any number of combustion chambers 22 and that combustion chambers 22 may be disposed in an "in-line" configuration, in a "V" configuration, in an opposing-piston configuration, or in any other suitable configuration.

Piston 20 may be configured to reciprocate within liner 16 between a top-dead-center (TDC) position and a bottom-dead-center (BDC) position during a combustion event occurring with chamber 22. In particular, piston 20 may be pivotally connected to a crankshaft 24 by way of a connecting rod 26, so that a sliding motion of each piston 20 within cylinder liner 16 results in a rotation of crankshaft 24. Similarly, a rotation of crankshaft 24 may result in a sliding motion of piston 20. In a four-stroke engine, piston 20 may move through four full strokes to complete a combustion cycle of about 720° of crankshaft rotation. These four strokes include an intake stroke (TDC to BDC), a compression stroke (BDC to TDC), a power stroke (TDC to BDC), and an exhaust stroke (BDC to TDC). Fuel (e.g., diesel fuel, gasoline, gaseous fuel, etc.) may be injected into combustion chamber 22 during the intake stroke. The fuel may be mixed with air and ignited during the compression stroke. Heat and pressure resulting from the fuel/air ignition may then be converted to useful mechanical power during the ensuing power stroke. Residual gases may be discharged from combustion chamber 22 during the exhaust stroke.

Figure 2:
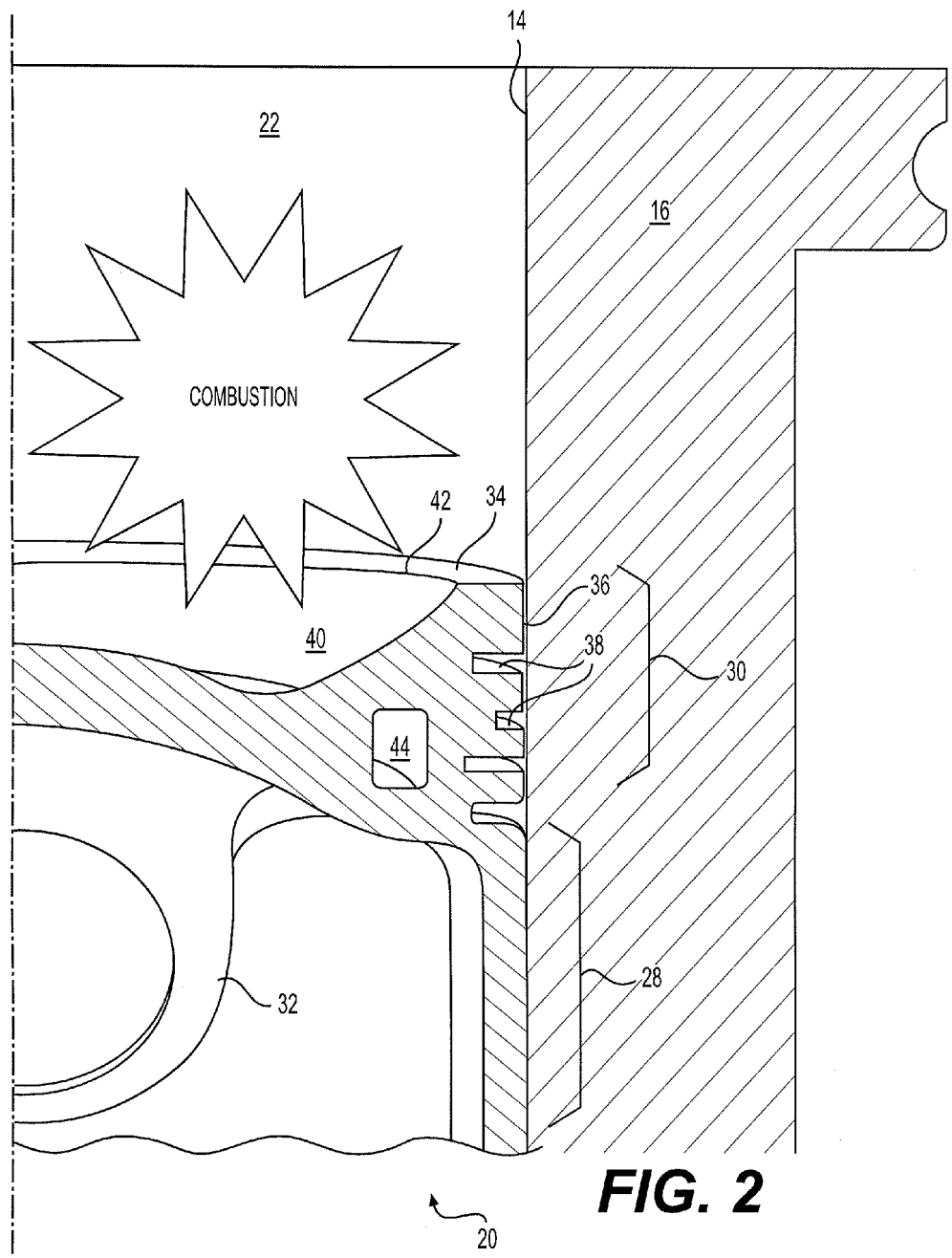
FIG. 2 is a cross-sectional illustration of an exemplary disclosed piston that may be used in conjunction with the engine of FIG. 1.

As shown in FIG. 2, piston 20 may generally consist of a skirt 28 and an integral crown 30. Skirt 28 be generally tubular (i.e., hollow and cylindrical), with a bearing support 32 formed therein. Support 32 may be configured to receive a wrist pin that pivotally connects piston 20 to rod 26 (referring to FIG. 1). Crown 30 may be formed at end of piston 20 opposite support 32, and include an end face 34 and an annular side surface 36. One or more ring grooves 38 may be cut into annular side surface 36 and configured to receive corresponding oil rings (not shown), compression rings (not shown), or another type of piston ring known in the art. A bowl 40 may be recessed within end face 34, and a rim 42 may be located at an intersection of bowl 40 and end face 34. An annular cooling passage 44 may be formed in crown 30 between bowl 40 and grooves 38. The circulation of engine oil or another coolant through passage 44 during operation of engine 10 may reduce a temperature of crown 30. With this configuration, the engine oil functions as a heat sink, causing combustion heat from inside bowl 40 to pass radially outward and downward in a direction toward cooling passage 44.

Figure 3:
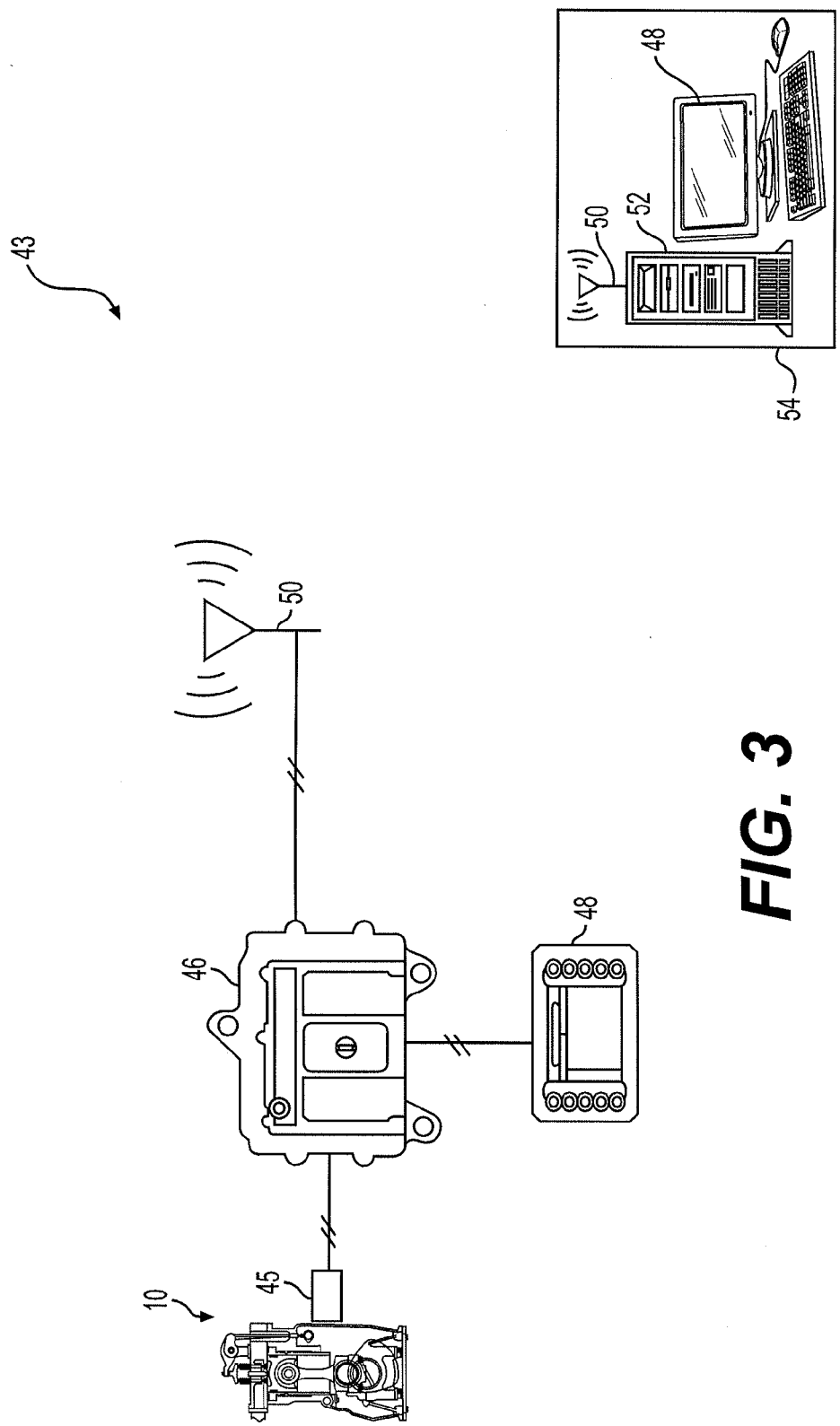
FIG. 3 is a diagrammatic illustration of an exemplary disclosed control system that may be used in conjunction with the engine of FIG. 1 to determine a damage count of the piston of FIG. 2.

As shown in FIG. 3, a control system 43 may be provided for use in monitoring damage of engine 10 caused by heat and pressure. Control system 43 may include, among other things, at least one sensor 45 and a controller 46. As will be described in more detail below, controller 46 may be configured to determine in real-time a temperature and a pressure acting on piston 20 (e.g., on rim 42), and a corresponding damage count based on signals from sensor(s) 45 and using one or more models stored in memory.

Sensor(s) 45 may be configured to generate signals indicative of parameter values associated with the combustion process occurring inside engine 10. Any number and types of sensor(s) 45 may be used for this purpose. In the disclosed exemplary embodiment, the signals generated by sensor(s) 45 include a speed of engine 10 (e.g., a rotational speed of crankshaft 24), a quantity of fuel being injected into combustion chamber 22 during each combustion cycle, a timing of the fuel being injected, a pressure of the fuel being injected, a flow rate of air entering combustion chamber 22 during each combustion cycle, a temperature of the air, a pressure of the air, and a temperature of the engine oil in passage 44. In some embodiments, sensor(s) 45 may be existing sensors already being used for other or additional purposes. In other embodiments, sensor(s) 45 may be dedicated sensors used only for damage-counting purposes. Regardless, the signals generated by sensor(s) 45 may be directed to controller 46 for further processing.

It is contemplated that any one or more of sensor(s) 45 described above may embody virtual sensors rather than physical sensors, if desired. A virtual sensor may produce an algorithm-driven estimated value based on one or more other known or measured values. For example, based on a known or measured operating speed, fuel quantity, injection timing, fuel pressure, air flow rate, air temperature, air pressure, coolant temperature, or other parameter of engine 10, a model, table, and/or equation may be referenced to estimate another of the operating parameters. As a result, the value of any signal described above as being directed from sensor 45 to controller 46 may be estimated rather than directly measured. It is contemplated that instead of a separate element performing these estimations, the virtual sensing functions could be accomplished by controller 46, itself, if desired.

Controller 46 may include means for monitoring, recording, storing, indexing, processing, communicating and/or controlling various engine operations. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

In addition to controller 46, in some embodiments, system 43 may also include a display 48 and/or a communications device 50 allowing for communication with a local operator and/or another controller 52 located at a back office 54. In some embodiments, system 43 includes both display 48 and communications device 50. Controller 46 may be in communication with each of these other components and/or with controller 52 at back office 54 (e.g., via a communication device 50), and configured to determine, based on signals from these components and based on other known information stored in memory, a damage count of piston 20 and/or instructions regarding servicing or replacement of piston 20.

Display 48 may include one or more monitors (e.g., a liquid crystal display (LCD), a cathode ray tube (CRT), a personal digital assistant (PDA), a plasma display, a touchscreen, a portable hand-held device, or any such display device known in the art) configured to actively and responsively show a damage count of piston 20, related recommendations, warnings, instructions, etc. to an operator of engine 10. Display 48 is typically disposed in close proximity to controls of engine 10 and/or within the view of the operator. However, in some applications, display 48 could be located remotely (e.g., at back office 54), if desired. Display 48 may be connected to controller 46 (or controller 52), and controller 46 may execute instructions to render graphics and images on display 48.

Communications device 50 may be configured to facilitate communication between controller 46 and controller 52. Communications device 50 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, controller 46 may be omitted, and controller 52 may communicate directly with sensor(s) 45 and/or display 48 via communications device 50, if desired. Other means of communication may also be possible.

Figure 4:
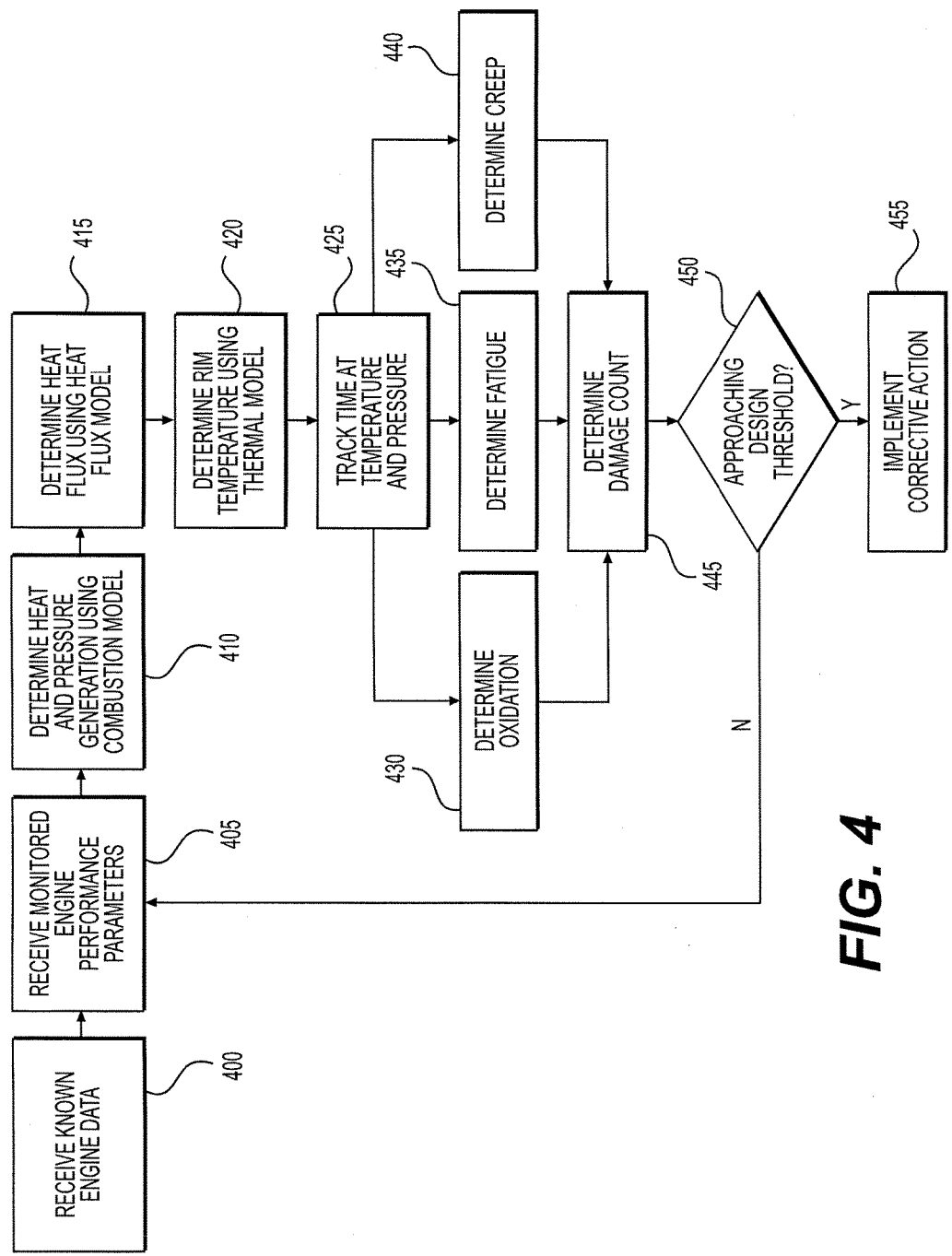
FIG. 4 is a flowchart depicting an exemplary method of damage counting that may be performed by the control system of FIG. 3.

Controllers 46 and/or 52, based on the information received from sensor(s) 45, can be configured to execute instructions stored on computer readable medium to perform methods of engine monitoring (e.g., damage counting) and control. An exemplary method that can be performed by controllers 46 and/or 52 is illustrated in FIG. 4, and will be explained in more detail in the following section to further illustrate the disclosed concepts.

INDUSTRIAL APPLICABILITY

The disclosed system may be used in any application where it is desired to increase the reliability of an associated engine. The disclosed system may increase engine reliability by tracking a damage count of piston 20, and selectively responding when the damage becomes excessive. Operation of system 43 will now be described with reference to FIG. 4.

At one or more points in the life cycle of engine 10, controller 46 of system 43 may receive known data regarding a current configuration of engine 10 (Step 400). This data may be manually or automatically loaded into the memory of controller 46 during manufacture of engine 10, loaded into the memory at any time that the hardware of engine 10 is modified or replaced, and/or updated throughout the life of engine 10 as engine 10 wears or is serviced. The data may include, among other things, the general component consist of engine 10, physical parameters (e.g., shapes, sizes, contours, material properties such as coefficients of heat transfer, etc.) of the components, and/or relationships (e.g., a compression ratio, a bore stroke, valve timings, etc.) between the components. For example, when engine 10 is manufactured, physical parameters of a particular piston 20 assembled into engine 10 may be loaded into controller 46. Thereafter, when the particular piston 20 is replaced with another piston having a different shape, size, contour, or material property, corresponding physical parameters may be updated within the memory of controller 46. It is also contemplated that, as the particular piston wears over a period of engine operation and associated parameters change (e.g., a contour of bowl 40, a radius of rim 42, etc.), those parameters could be manually and/or automatically updated to reflect the changes. In another example, the known data received by controller 46 may be associated with the various fluids (fuel, lubrication, coolant, engine oil, air, etc.) inside engine 10. In this example, the known data could include a makeup, concentration, quality, or other fluid parameter known in the art.

During operation of engine 10, controller 46 may continuously (e.g., at a rate of about 0.01 to 100 Hz, typically 1 Hz) receive values of monitored engine performance parameters (Step 405). These values may be in the form of signals generated by one or more of sensor(s) 45. As described above, the performance parameters may be representative of factors influencing the combustion process occurring inside combustion chamber 22, and include an engine speed, an injected fuel quantity, an injection timing, an injection pressure, an air flow rate, an air temperature, an air pressure, and an engine oil temperature.

Based on the known data received at step 400 and the measured data received at step 405, controller 46 may reference a combustion model stored in memory to determine an amount of heat and a pressure generated during the combustion process inside combustion chamber 22 (e.g., inside bowl 40) (Step 410). The combustion model may relate an amount of chemical energy being directed into engine 10 at any given point in time, along with a conversion efficiency of engine 10, to a resulting heat energy amount and cylinder pressure. It is important to note that the combustion model used in step 410 may be a general model, which is made specific to engine 10 using the known data received at step 400. Accordingly, the same combustion model may be used on different engines and/or in the same engine with different component configurations, as long as the known data is updated to reflect the corresponding physical differences. In this way, the disclosed system may have broad applicability.

Controller 46 may use the output of the combustion model to determine a heat flux through piston 20 using a heat flux model stored in memory (Step 415). The heat flux model may indicate how much of the heat energy exits engine 10 by way of increased temperature of the surrounding components. More specifically, the heat flux model may indicate how much of the heat energy passes through rim 42 toward the engine oil in passage 44. The heat flux model may rely on convection and radiation, as represented via EQ. 1 and EQ. 2 below, respectively:

$$q''_{conv} = h(T_H - T_R) \qquad \text{EQ. 1}$$

$$q''_{rad} = \varepsilon\sigma(T_H^4 - T_R^4) \qquad \text{EQ. 2}$$

wherein:
  $q''_{conv}$ is the heat flux into rim 42 from convection;
  $q''_{rad}$ is the heat flux into rim 42 from radiation;
  h is the heat transfer coefficient of piston 20;
  $\varepsilon$ is the emissivity coefficient;
  $\sigma$ is the Stefan Boltzman constant;
  $T_H$ is the temperature of combustion gas inside bowl 40; and
  $T_R$ is the wall temperature of rim 42.

In equations EQ. 1 and EQ. 2 above, the heat transfer coefficient h may be determined as a function of known material properties of piston 20 received at step 400 and a speed (e.g., a mean speed) of engine 10 measured at step 405. The temperature $T_H$ may be determined as a function of the Ideal Gas Equation and the output from the combustion model (i.e., the amount of chemical energy from the injected fuel converted to heat energy). The bowl wall temperature $T_R$ may be held at a constant value (e.g., about 420° K) in order to provide stability in the heat flux model. Using EQ. 1 and EQ. 2 in the manner described above, the heat flux may be determined for only closed-chamber conditions. Closed-chamber conditions may occur during only the compression and power strokes, when any associated valves (e.g., exhaust and/or intake valves—not shown) are in flow-blocking positions.

In order to accurately determine heat loading of rim 42, however, the heat flux model should account for an amount of heat passing through rim 42 during all 720° of the combustion cycle. In order to do this, the cylinder gas temperatures must be estimated during the times when combustion chamber 22 is open. Intake valve closing and exhaust valve opening times may be different for each engine 10 and/or engine configuration, and provided for the particular engine configuration at step 400 described above.

The heat flux occurring during the intake and exhaust strokes of the combustion cycle (i.e., when the intake and/or exhaust valves are open) may also be determined use equations EQ. 1 and EQ. 2 above. However, when calculating heat flux during the intake stroke, instead of using the cylinder gas temperature $T_H$ in the equations, an air temperature (e.g., an inlet manifold temperature—as measured by sensor 45 at step 410) may instead by utilized. Likewise, when calculating heat flux during the exhaust stroke, instead of using the cylinder gas temperature $T_H$ described above, a previously calculated cylinder gas temperature (e.g., a temperature calculated at a last closed-chamber crank angle just prior to the exhaust valve opening) may instead be utilized throughout the exhaust stroke. Controller 46 may then sum the convection and radiation heat flux values at every angle of crankshaft rotation, integrate the sum over the 720° of the cycle, and then average the integral over the 720°.

Controller 46 may then determine a temperature at rim 42 and throughout the rest of crown 30 using the heat flux calculated at step 415 and a thermal model stored in memory (Step 420). In the disclosed example, the thermal model is used to determine a temperature at rim 42 and throughout the rest of crown 30 for every degree of crank angle revolution, taking into account known data about piston 20 (e.g., wall thickness, surface finish, air gaps, associated breaks, geometry of any grooves 38, heat transfer coefficient, etc.) and known and measured information about the engine oil inside passage 44 (e.g., heat transfer coefficient and coolant temperature).

Controller 46 may then track a time during which piston rim 42 is exposed to elevated temperatures and pressures (Step 425). In particular, controller 46 may divide a full temperature spectrum of engine 10 into a plurality of temperature ranges (e.g., 5° ranges) and a full pressure spectrum into a plurality of pressure ranges (e.g., 50 psi), and selectively increment a duration of operational engine time that rim 42 is exposed to temperatures and pressures within each range. For example, controller 46 may create a first temperature range of about 200-204°, a second range from 205-210°, etc. Likewise, controller 46 may create a first pressure range of about 800-849 psi, a second range from 850-899 psi, etc. And each time that controller 46 determines that the temperature or pressure at rim 42 falls within one of these ranges, controller 46 may increment an amount of time spent at the particular temperature or pressure within the corresponding ranges.

Rim 42 has historically been known to fail due to a combination of three different causes, namely oxidation, fatigue, and creep. Oxidation is a change in chemical composition due to exposure of rim 42 to elevated temperatures over time. Oxidation can cause rim 42 to become brittle and prone to cracking. Fatigue is the growth of cracks in rim 42 due to repeated strain related to elevated pressures, and can be exacerbated by elevated temperatures. Creep is the tendency for the solid material of rim 42 to deform over time due to long-term exposure to high pressures and temperatures. In order to determine an amount of damage occurring in rim 42 during operation of engine 10 as a result of the repeated and long-term exposure to elevated temperatures and pressures, the individual influences of oxidation, fatigue, and creep must be accounted for according to the following equation EQ. 3:

$$\frac{1}{N^{Total}} = \frac{1}{N^{Oxide}} + \frac{1}{N^{Creep}} + \frac{1}{N^{Fatigue}} \qquad \text{EQ. 3}$$

wherein:

$\frac{1}{N^{Total}}$ is the total damage caused to piston rim 42;

$\frac{1}{N^{Oxide}}$ is the influence of oxide on piston rim damage;

$\frac{1}{N^{Fatigue}}$ is the influence of fatigue on piston rim damage; and $\frac{1}{N^{Creep}}$ is the influence of creep on piston rim damage.

Controller 36 may be configured to determine the influence of oxidation at rim 42 (Step 430), the influence of fatigue of rim 42 (Step 435), and the influence of creep of rim 42 (Step 440) based on the temperatures and pressures acting on rim 42 over the monitored periods of time. Many different methods and equations may be used to determine these influences. In the disclosed embodiment, the influence of oxidation may be determined using the exemplary oxidation equation EQ. 4 below; the influence of fatigue may be determined using the exemplary fatigue equation EQ. 5 below, and the influence of creep may be determined using the exemplary creep equation EQ. 6 below:

$$\frac{1}{N^{Oxide}} = \left[ \frac{h_{cr} \cdot \delta_o}{B \cdot \Phi^{oxide} \cdot K_p} \right]^{-\frac{1}{\beta}} \cdot \frac{2(\Delta \varepsilon_{mech})^{(2/\beta)+1}}{\varepsilon^{1-(\alpha/\beta)}} \qquad \text{EQ. 4}$$

wherein:

$\frac{1}{N^{Oxide}}$ is the damage influence due to oxidation;

$h_{cr}$ is the critical oxide crack length for piston rim 42 after a time at elevated temperatures;

$\delta_o$ is a material constant for piston rim 42;

B is a material constant representing the oxide growth coefficient for piston rim 42;

$\Phi^{oxide}$ is a cycle phase factor determined as a function of the temperature range;

$K^p$ is the material constant of piston rim 42 determined as an averaging function of the temperature range over the exposure time for the range;

β is a material constant representing an oxide growth exponent for piston rim 42;

$\Delta \varepsilon_{mech}$ is the mechanical strain range for piston rim 42 determined as a function of pressure;

ε is the strain acting on piston rim 42 determined as a function of pressure; and α is a material constant for piston rim 42.

$$\frac{\Delta \varepsilon_{mech}}{2} = C(2N^{Fatigue})^d \qquad \text{EQ. 5}$$

wherein:

$\Delta \varepsilon_{mech}$ is the mechanical strain range for piston rim 42 determined as a function of pressure;

C is a material constant for piston rim 42;

$N^{Fatigue}$ is the damage influence due to fatigue; and d is a material constant for piston rim 42.

$$\frac{1}{N^{Creep}} = \Phi^{creep} \cdot \int_0^{t_c} A \cdot e^{(-\Delta H/RT(t))} \cdot \left[ \frac{\frac{1}{3}\bar{\sigma} + \sigma_H}{K} \right]^m dt \qquad \text{EQ. 6}$$

wherein:
 $\Phi^{oxide}$ is a cycle phase factor determined as a function of the temperature range;
 A is a material constant for piston rim 42;
 ΔH is an activation energy for creep;
 $\bar{\sigma}$ is an effective stress determined as a function of pressure;
 $\sigma_H$ is a hydrostatic pressure determined as a function of pressure;
 K is a drag stress; and
 m is a material constant for piston rim 42.

Controller 46 may use the time tracked in each temperature and pressure range at step 425 to determine a damage count for piston rim 42 based on a damage model stored in memory (Step 445). In particular, for a particular design of piston rim 42, that piston rim 42 may have a durability that varies based on the time spent in a particular combination of each of the temperature and pressure ranges. The durability may represent an amount a damage that can be safely accumulated, as determined through lab testing. And based on EQ. 3 above and the actual time spent in each temperature and pressure range, controller 46 may be able to determine the damage count of piston rim 42. Controller 46 may be configured to compare the damage count of piston rim 42 to one or more design thresholds, to see if the damage count of piston rim 42 is approaching a design limit (Step 450). In one embodiment, controller 46 may continuously make this comparison. In other embodiments, controller 46 may only make this comparison when prompted to do so (e.g., by a service technician) or periodically, as desired. As long as the damage count remains below a design limit of piston rim 42 (Step 450:N), control may return to step 410.

However, when the damage count approaches the design limit (Step 470:Y), controller 46 may be configured to implement a corrective action (Step 455). The corrective action could include, among other things, causing a notice of the approach to be shown on display 48 or communicated to back office 54, causing a warning to be generated, causing service instructions to be provided, causing service of engine 10 to be automatically scheduled, and/or causing engine 10 to be derated or even shut down. In some instances, multiple design limits may be utilized at step 455, with increasingly severe corrective actions selectively implemented based on the design limits being incrementally crossed.

The disclosed system may have broad applicability. In particular, the system may be applicable to any type and design of piston 20, and may be useful during design and/or selection of piston 20 prior to use of piston 20 within engine 10. For example, the known data associated with and performance parameters measured from an existing engine may be used by controller 46 to simulate piston rim temperatures and pressures based on the combustion model, the heat flux model, and the thermal model. These simulated temperatures and pressures may then be used to design and/or select application-specific pistons 20. In addition, the system may provide information regarding the damage count of piston 20, and the information may remain accurate as engine 10 wears (assuming the wear conditions are updated as known data in the memory of controller 46). In addition, the system may be useful across multiple configurations or platforms of engines.

It should be noted that the concepts described in connection with this disclosure represent imbedded machine technology used to calculate a current status (e.g., a damage count) of a particular type of engine component. As described above, the disclosed concepts can be implemented by way of instructions pre-loaded into an engine controller. The disclosed concepts may rely on real-time information provided by one or more engine sensors in order to calculate the current status of the related components. The disclosed concepts do not necessarily involve predictions of future status changes of the engine components, and are not intended to represent a general data analytic platform.

The disclosed concepts can be used during development of the engine components based on historic engine data, if desired. In particular, the disclosed concepts can be used to determine the status of the engine components given particular operating conditions. For example, based on a calculated damage count calculated for the engine components when exposed to the particular operating conditions, properties and/or geometry of the engine components can be changed so as to reduce the damage count for the same components exposed to the same operating conditions.

It will be apparent to those skilled in the art that various modifications and variations can be made to the disclosed system. Other embodiments will be apparent to those skilled in the art from consideration of the specification and practice of the disclosed system. For example, it may be possible for engine 10 to not have liners 16, if desired, and for piston 20 to reciprocate directly within cylinder bores 14. It is intended that the specification and examples be considered as exemplary only, with a true scope being indicated by the following claims and their equivalents.

What is claimed is:

1. A control system imbedded within an engine having at least one combustion chamber and a piston associated with the at least one combustion chamber, the control system comprising:
   at least one sensor configured to generate a signal indicative of a combustion process occurring inside the at least one combustion chamber; and
   a controller in communication with the at least one sensor and configured to:
      determine an amount of heat and a pressure generated inside the at least one combustion chamber based on the signal and a combustion model of the engine;
      determine a heat flux through the piston based on the amount of heat and a heat flux model of the piston;
      determine a temperature at a rim of the piston based on the heat flux and a thermal model of the piston;
      track a time at the temperature and the pressure; and
      determine a damage count of the piston based on the time at the temperature and pressure.

2. The control system of claim 1, wherein the signal is indicative of at least one of a speed of the engine, a quantity of fuel being injected into the at least one combustion chamber, a timing of the fuel being injected, a pressure of the fuel being injected, a flow rate of air entering the at least one combustion chamber, a temperature of the air, and a pressure of the air.

3. The control system of claim 1, wherein the controller is configured to determine the damage count in real time.

4. The control system of claim 3, wherein the controller is configured to determine the damage count at a frequency of about 1 Hz.

5. The control system of claim 1, wherein the controller is configured to determine the damage count based on a damage model of the piston.

6. The control system of claim 5, wherein the damage model accounts for damage influenced by oxidation, creep, and fatigue.

7. The control system of claim 1, wherein the controller is further configured to selectively implement a corrective action based on the damage count and a design limit of the piston.

8. The control system of claim 7, wherein the controller is configured to generate a notice when the damage count exceeds a first percent of the design limit.

9. The control system of claim 8, wherein the controller is further configured to recommend servicing of the piston when the damage count exceeds a second percent of the design limit that is greater than the first percent.

10. The control system of claim 9, wherein the controller is further configured to automatically schedule servicing of the piston when the damage count exceeds a third percent of the design limit that is greater than the second percent.

11. The control system of claim 1, wherein the thermal model represents heat flow radially outward from a center of the at least one combustion chamber.

12. The control system of claim 1, wherein:
the signal is a first signal;
the control system further includes a coolant sensor configured to generate a coolant signal indicative of a temperature of coolant circulated through the piston; and
the controller is configured to determine the temperature at the rim of the piston based further on the coolant signal.

13. The control system of claim 12, wherein the controller is configured to determine the heat flux through the engine based further on known material and geometry data of the piston and the coolant.

14. The control system of claim 1, wherein the controller is configured to determine the amount of heat generated inside the at least one combustion chamber based further on a known compression ratio of the engine, a known bore diameter of the at least one combustion chamber, a known stroke length of the piston, and an assumed mixing of fuel and air occurring inside the at least one combustion chamber.

15. The control system of claim 1, wherein the controller is configured to:
determine an average heat flux through the engine during a 720° crank-angle period of operation of the engine;
determine the temperature at the rim of the piston based on the average heat flux; and
determine the heat flux through the piston based on a known position of the piston during the 720° crank-angle period of operation of the engine.

16. The control system of claim 1, wherein the controller is further configured to determine a current status of the piston based on the damage count and a design limit.

17. A method of monitoring an engine by an imbedded control system, the method comprising:
sensing at least one parameter of a combustion process occurring inside at least one combustion chamber of the engine;
determining an amount of heat and a pressure generated inside the at least one combustion chamber based on the at least one parameter, a known compression ratio of the engine, a known bore diameter of the at least one combustion chamber, a known stroke length of an associated piston, an assumed mixing of fuel and air occurring inside the at least one combustion chamber, and a combustion model of the engine;
determining a heat flux through the piston based on the amount of heat, known material and geometry data of the piston, and a heat flux model of the engine;
determining a temperature of coolant circulating through the piston;
determining a temperature at a rim of the piston based on the heat flux, a thermal model of the piston, and the temperature of the coolant;
tracking a time at the temperature and the pressure; and
determining in real-time a damage count of the piston based on the time at the temperature and pressure and based on a damage model of the piston.

18. The method of claim 17, wherein the at least one parameter is at least one of a speed of the engine, a quantity of fuel being injected into the at least one combustion chamber, a timing of the fuel being injected, a pressure of the fuel being injected, a flow rate of air entering the at least one combustion chamber, a temperature of the air, and a pressure of the air.

19. The method of claim 17, wherein:
determining the heat flux through the piston includes determining an average heat flux through the piston during a 720° crank-angle period of operation of the engine; and
determining the temperature at the rim of the piston includes determining the temperature at the rim of the piston based on the average heat flux and a known position of the piston during the 720° crank-angle period of operation of the engine.

20. The method of claim 17, further including determining a current status of the piston based on the damage count and a design limit.

* * * * *